June 14, 1960  R. A. MULLER  2,940,491
APPARATUS FOR EDGE JOINING PLYWOOD VENEER SHEETS
Filed Aug. 10, 1955  5 Sheets-Sheet 2

Inventor:
Robert A. Muller,
by
Attorney

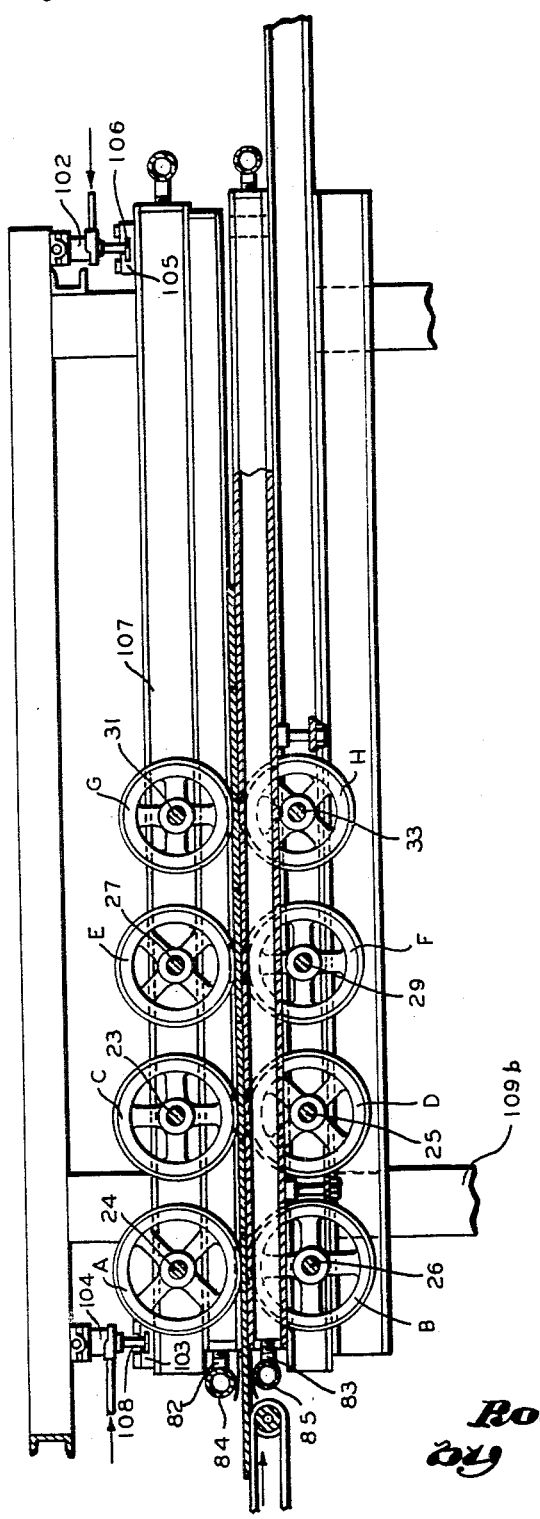

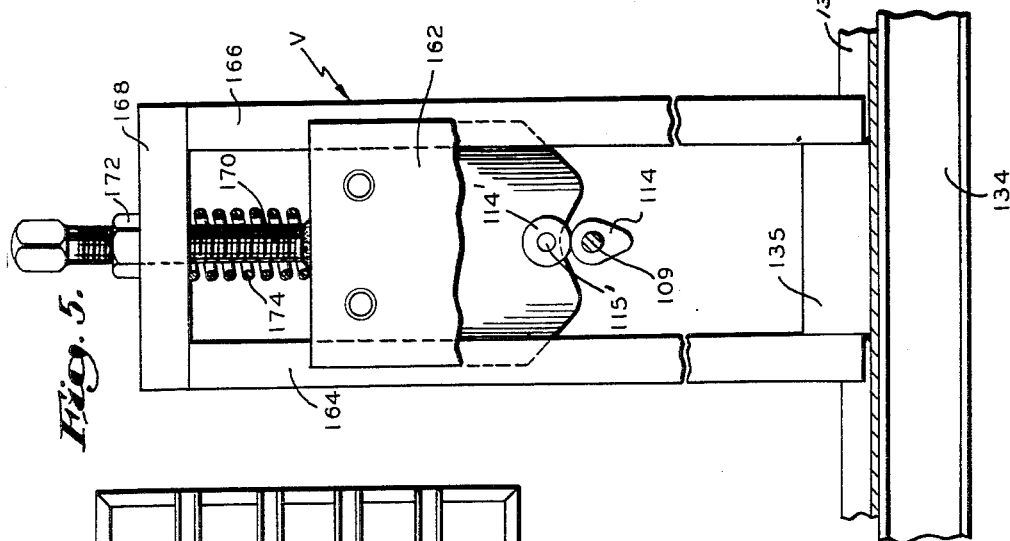
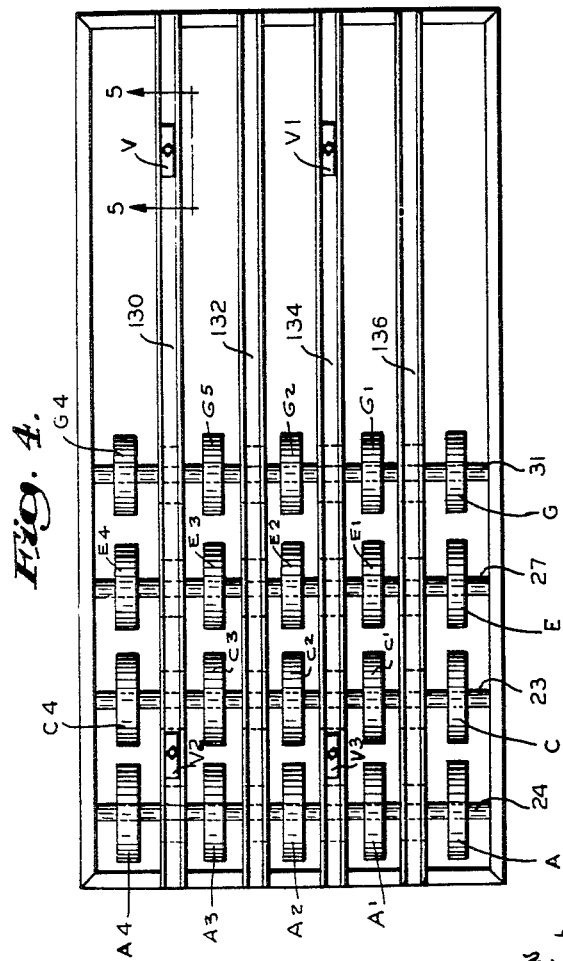

June 14, 1960   R. A. MULLER   2,940,491
APPARATUS FOR EDGE JOINING PLYWOOD VENEER SHEETS
Filed Aug. 10, 1955   5 Sheets-Sheet 5
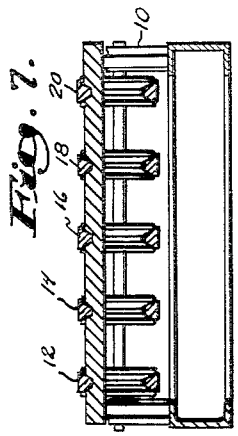
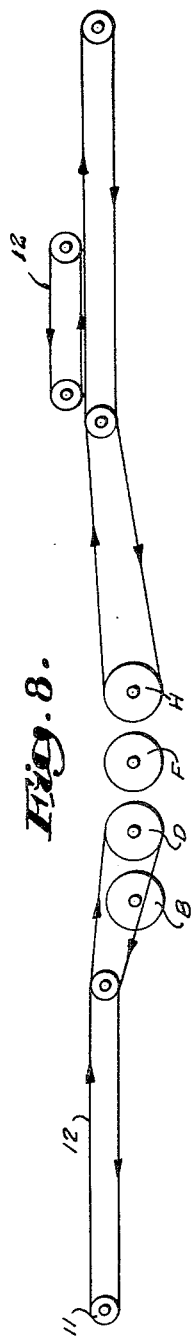
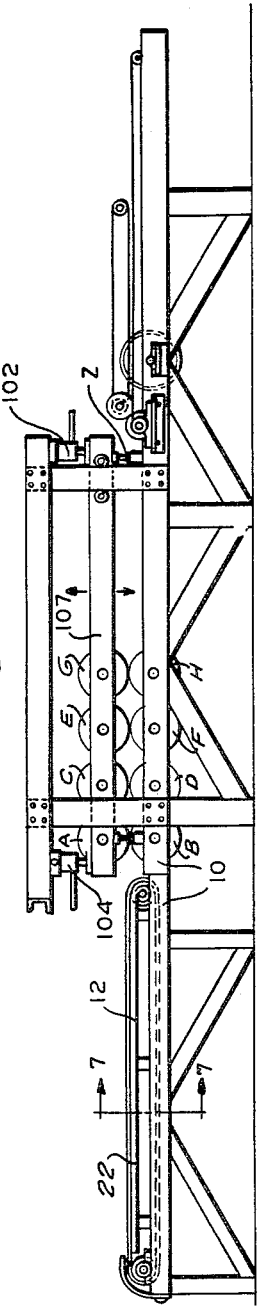

United States Patent Office 2,940,491
Patented June 14, 1960

2,940,491

APPARATUS FOR EDGE JOINING PLYWOOD VENEER SHEETS

Robert A. Muller, New London, N.H., assignor to Atlas Plywood Corporation, Boston, Mass., a corporation of Massachusetts Filed Aug. 10, 1955, Ser. No. 527,554

7 Claims. (Cl. 144—279)

This invention relates to a method and apparatus for edge joining of sheet media such as plywood veneer sheets and, in particular, relatively small pieces of plywood veneer which occur in different sizes and which are desired to be joined together and laminated with relatively larger sheets so as to effect important savings in dealing with waste stock from the manufacture of plywood. It should be understood that a conventional form of joining machine well known in the plywood joining art may be employed to cut the variously sized sheets with parallel edges and to apply a standard type of glue to these cut edges. Since the operation of cutting and edge gluing is a common practice in the art, no attempt is made to show such apparatus in the drawings or to describe such steps. Likewise, no attempt has been made to show or describe the method and apparatus for laminating a joined length of material with top and bottom sheets, as this also is carried out by conventional apparatus and procedures ordinarily followed in making plywood.

At the present time, very considerable losses develop from the small waste ends which develop in making and utilizing plywood veneer. Inasmuch as these relatively small pieces of plywood occur in varying lengths and widths, there has been, so far as I am aware, no satisfactory way of properly combining the pieces to make usable larger pieces. A chief difficulty is found in holding the pieces together with their edges in abutting relation while exerting the necessary pressure and heat required to obtain a satisfactory jointed relationship of the constituent pieces.

It is an object of the invention to devise a method and machine for dealing with the problem indicated. Another object is to provide a technique for holding small sections or pieces of plywood in abutted relationship so that each piece may be subjected to compressive forces which act in two dimensions and which may progressively increase in magnitude to reach a maximum in synchronized relationship.

These and other objects and novel features will be more fully understood and appreciated from the following description of a preferred embodiment of the invention selected for purposes of illustration and shown in the accompanying drawings, in which:

Fig. 3 is a longitudinal vertical section partly in elevation taken centrally of the machine;

Fig. 4 is a plan view illustrating details of an elevating platen structure of the invention;

Fig. 5 is a fragmentary detail view taken approximately on the line 5—5 of Fig. 4;

Fig. 6 is a side elevational view of the machine;

Fig. 7 is a detail cross-section taken on the line 7—7 of Fig. 6; and

Fig. 8 is a diagrammatic view of a drive for the machine.

As one way of satisfactory exerting compressive forces which act on a sheet material in two dimensions simultaneously, I have devised a unique combination of driving wheels and vertically adjustable press mechanism by means of which I am enabled to produce controlled forward motion of the sheet media. During this forward motion, vertically directed compressive forces are built up to reach a maximum in timed relationship with the development of horizontally acting compressive forces which approach their maximum value at approximately the point of maximum intensity of the vertically exerted forces.

Figure 1:
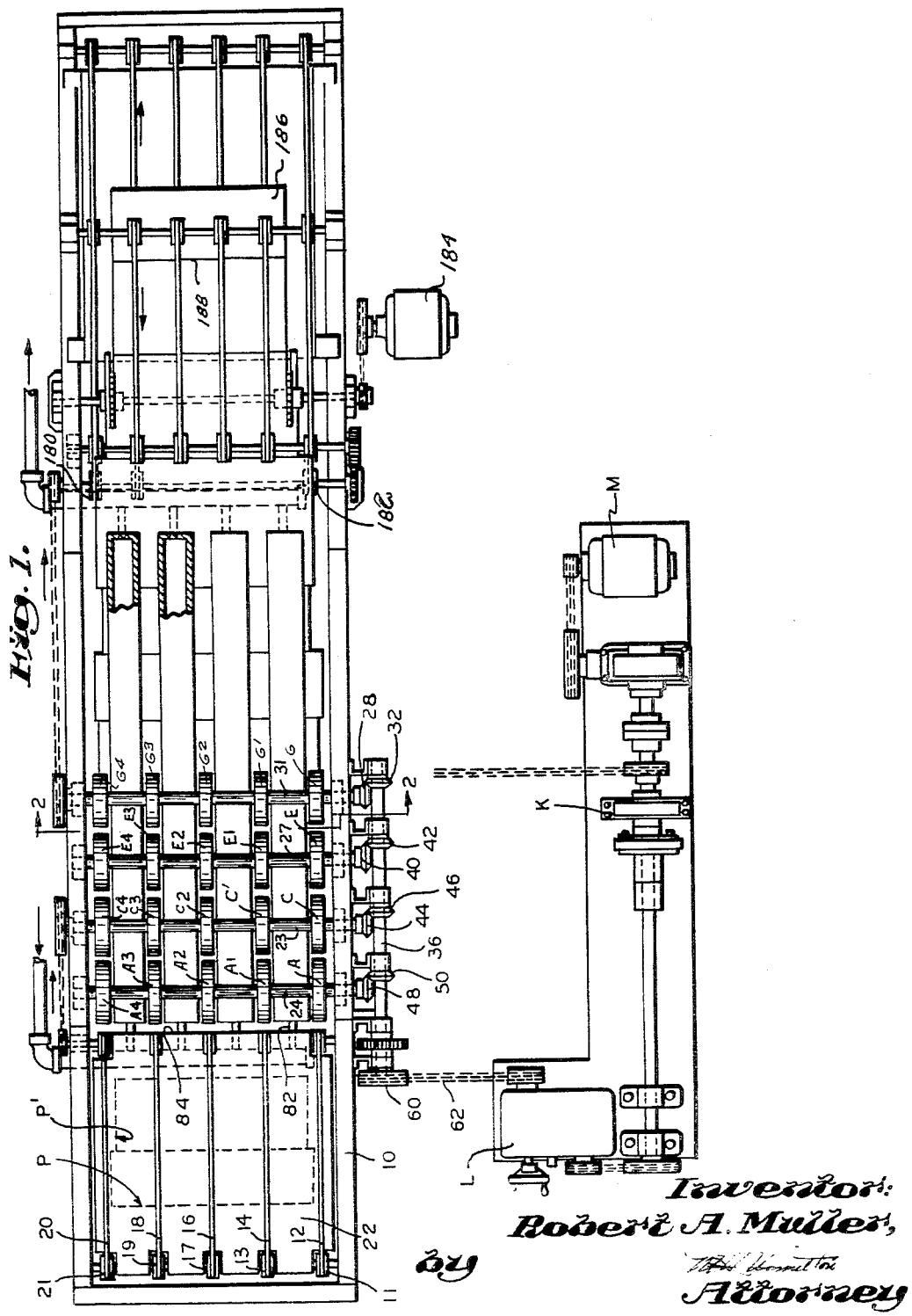
Fig. 1 is a plan view of the edge joining machine of the invention.
Figure 2:
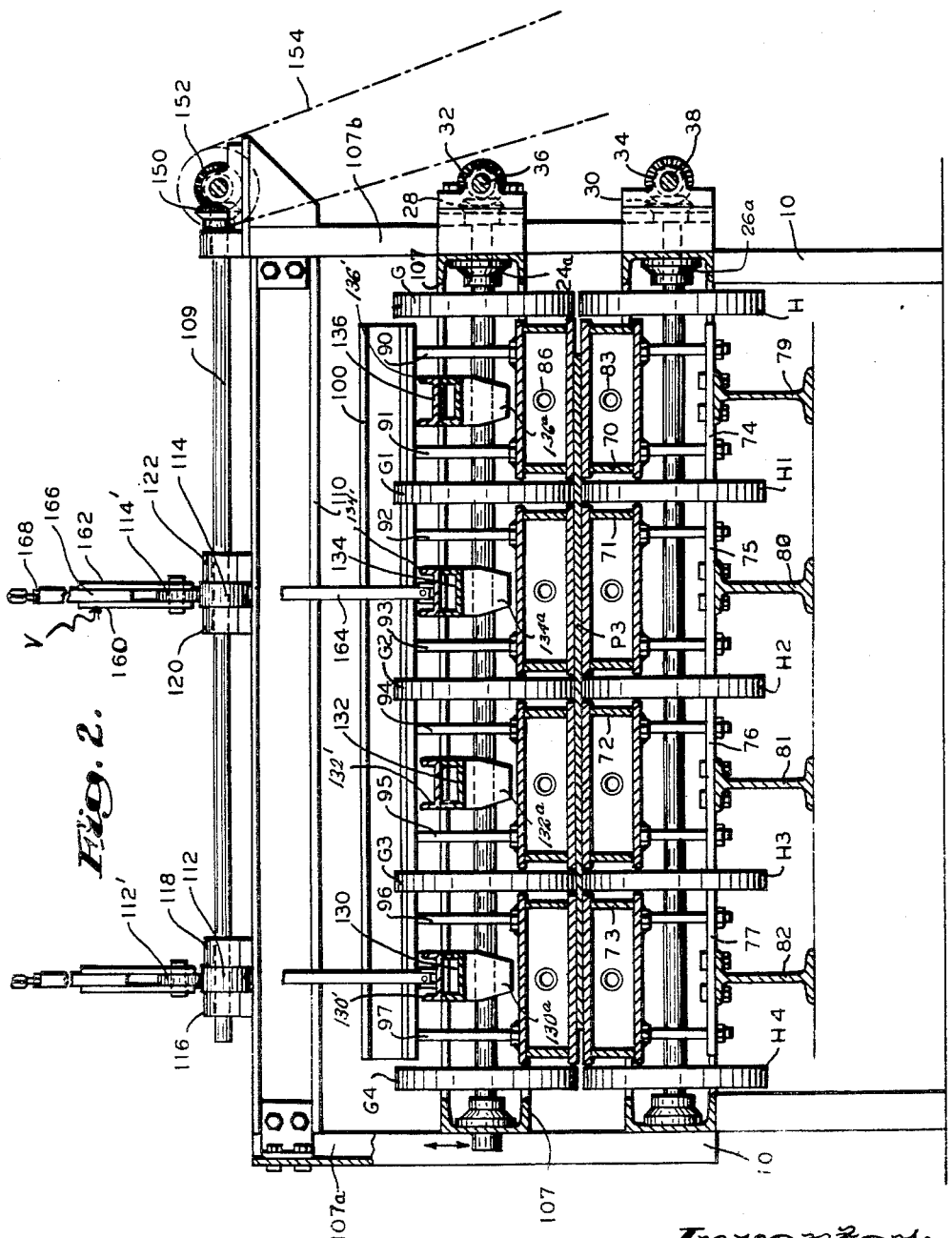
Fig. 2 is a transverse vertical cross-section taken approximately on the line 2—2 of Fig. 1.

In the structure shown in the drawings, numeral 10 denotes an elongated frame or raised table for supporting the plywood handling mechanism of the invention. This frame is shown in Figs. 1 and 2 and on a somewhat smaller scale in Fig. 6. As noted in Fig. 1 at the left-hand side thereof, I provide conveyor means which may, for example, consist of a plurality of endless belts 12, 14, 16, 18 and 20 led around pulleys as 11, 13, 15, 17, 19 and 21. A table 22 is mounted on the frame in a position to firmly support the belts. This conveyor arrangement constitutes an assembly table on which may be located a plurality of pieces of plywood as suggested by the arrows P, P' shown in dotted lines in Fig. 1, and occurring with their adjacent edges arranged in abutting relationship. When the conveyor belts are driven, the pieces of plywood are advanced along a horizontal path of movement into engagement with and between pairs of upper and lower driving rolls as A and B, C and D, E and F, and G and H. Each pair of rolls is horizontally spaced apart from an adjacent pair of rolls, as shown in Figs. 2 and 3. The several pairs of rolls noted are mounted on respective upper and lower shafts as 24 and 26, which are supported for rotation between the two sides of the frame in suitable bearings 24a and 26a (Fig. 2). As shown in Fig. 4, each set of rolls A mounted on the shaft 24 comprise also the rolls A1, A2, A3 and A4. The next set of upper rolls C comprise also the rolls C1, C2, C3 and C4 mounted on the shaft 23. Additional sets of rolls E and G are mounted on the shafts 27 and 31 and comprise the rolls E1, E2, E3 and E4 for shaft 27 and rolls G1, G2, G3 and G4 for shaft 31. The lower set of rolls, four in number, B, D, F and H (see Fig. 3), comprise five rolls on each shaft corresponding to the upper rolls previously described.

At the outer ends of the shafts 31 and 33 are bevel gears as 28 and 30 which are in mesh with bevel gears as 32 and 34 on respective shafts 36 and 38. Similarly, shafts 27 and 29, 23 and 25, and 24 and 26 are driven by bevel gears as 40, 42, 44, 46, 48, 50. As may be seen from an inspection of Fig. 1, all of these gears are actuated by a sprocket 60 and chain 62 which is power driven from a motor M operating through a single revolution clutch K and a Reeves drive L, together with sprocket chain and sprocket gears as shown. All of the upper shafts 23, 24, 27 and 31 are secured on vertically adjustable mounts which carry the shafts 36 and 38 so that the entire set of upper rolls may be adjusted towards and away from the lower rolls to move into rolling contact with plywood sections passing therebetween, a single section of which has been shown in Fig. 2 and denoted by the reference character P3.

In accordance with the invention, I further provide for each successive set of upper and lower rolls being constructed with progressively smaller diameters going from the in feed to the out feed. Thus, rolls G and H, as well as all other rolls in this set of rolls are formed with the smallest diameter. Rolls E and F and similar rolls in this set are constructed with a slightly larger diameter.

Likewise, C and D rolls are longer and A and B rolls are made with the greatest diameter. By means of this arrangement, I find that I am enabled to exert a controlled compression force on plywood sections at points occurring between the A and B rolls and the G and H rolls. It will be seen that the G and H rolls, being of a smaller diameter, operate to hold back the speed of travel of the plywood section to a speed corresponding to the peripheral speed of the surfaces of rolls G and H while the other roll sets, activated by a common drive and being larger, travel at relatively higher peripheral speeds. This results in the larger rolls tending to urge the plywood sheet forwardly at progressively faster speeds than the peripheral speed of the G and H rolls. While a greater rate of speed for the plywood sections is not actually achieved, there is, with a properly controlled diameter change, a very appreciable force in compression developed in the plywood sections and, particularly, at the lines of abutment of these sections as may readily be understood.

With the development of such forces in compression, the plywood sections will necessarily seek to distort or buckle out of their path of forward travel and, in order to prevent this, I have further devised a cooperating press arrangement which includes a plurality of vertically oscillating press units or platens, best shown in Figs. 1–3, inclusive.

Attention is directed to Fig. 2 in which the details of construction of the presses may be more clearly seen. As shown therein, there are four lower press units and four upper press units and the several units are transversely spaced apart to conveniently occupy the space between the upper and lower driving rolls. The lower press units are denoted by the numerals 70, 71, 72 and 73 and these units are supported in a stationary position on brackets and base plates 74, 75, 76, 77 in turn received on angle iron members 82, 79, 80 and 81 located at floor level. Each of the lower press units are of similar construction and comprise rectangular enclosures having flat top surfaces which are adapted to be at the same level as the nip line of the driving wheels in a position suitable for bearing against the undersides of the plywood sections as they pass between the rolls. Communicating with the interior of each of the press enclosures are steam headers 83 which are connected into a steam supply line 85 to heat the presses to a desired temperature.

The upper press units are of the same rectangular shape and are similarly provided with steam heads as 86 and steam pipes 84 to provide for suitable heating. However, these upper press units are provided with a vertical lift mechanism and also means integral with the lift mechanism for producing a vertical oscillation through a very short stroke or displacement.

Considering first the vertical lift mechanism, I provide a raised transverse supporting frame of some suitable construction such as shown in the drawings and occuring immediately above the upper press units described. For example, I may provide a pair of transverse I-beams, such as the beams 110 as shown in Fig. 2. These two beams are located at opposite ends of the machine and are solidly secured in some suitable manner, as by bolts, welding or the like, to uprights 107a and 107b forming an extension of the machine frame. Secured to the underside of these I-beams 110 at points as indicated in Figs. 3 and 6, for example, I provide a number of air cylinder units of conventional type, two of which have been noted in the drawings by the numerals 102 and 104. These air cylinder units have depending therefrom lift rods 106 and 108 which engage in specially formed channels in respective channel connecting bars 103 and 105 in turn welded or bolted to the longitudinal I-beams 107a, as shown in Fig. 2.

It will be seen that these connecting bars 103 and 105 constitute the vertically adjustable mounts for the shafts 23, 24, 27 and 31 earlier indicated. Therefore, by means of the arrangement described, the air cylinders, when actuated, may operate to lift the entire upper press and roll assembly simultaneously and then to release this whole unit so that its weight may come to bear against sheet material occuring between itself and the lower set of press units.

Normally, the upper press unit may be located in a fully lowered position and I may desire to provide stop means as Z, as suggested in Fig. 6, to vary the exact weight condition which is allowed to be exerted on work passing through the machine. This first vertical adjustment may be permanently set and thereafter the machine is operated without changing this setting for a given set of requirements.

Considering secondly the vertically oscillatable means for the upper set of presses, attention is again directed to Figs. 2, 4 and 5 wherein I have shown means for periodically raising the press units during each revolution of the drive wheels and in timed relationship with movement of the wheels. For such an oscillating motion, I provide a cam-operated lift apparatus which includes as principal components a pair of transversely disposed shafts, one of which is shown in Fig. 2 and denoted by the numeral 109. These shafts are mounted at either end of the machine and supported for rotation between the sides of the machine on bearings 116, 118, 120 and 122, for example. These bearings on the respective beams as 110, as suggested in Fig. 2, with only two pairs of bearings having been included in the drawings but which are intended to constitute a disclosure of any other required number for dealing with each of the individual press units where this is required. The shafts as 109 are driven by some suitable means, such as, for example, sprocket gears as 150, 152 and chain 154, diagrammatically indicated at the right hand side of Fig. 2.

On these shafts at spaced intervals between the bearings noted are fixed cams as 112, 114, etc. These cams are in rolling engagement with and support thereon respective cam followers as 112', 114' which are pivotally received in press carrier units V, V1, (Fig. 4) and one of which, V, is shown in more detail in Fig. 5.

As noted in Fig. 5, the cam followers are supported, for example, on pins as 115' received through two spaced-apart sides 160, 162 of the carrier unit V (Fig. 2). Fastened between the side elements 160 and 162 are vertical arms as 164 and 166 which are connected at their upper ends by a bar as 168 (Figs. 2 and 5). An adjustment screw 170 is threaded through the bar 168, as shown in Fig. 5, and is provided with a locking screw 172 to provide for adjusting the position of the vertical arms with respect to the side plates and a spring 174 resiliently separates these parts.

Suspended from the lower ends of the vertical arms 164, 166 are longitudinally extending angle iron sections as 130', 132', 134' and 136' (Fig. 2) of which only section 134' is directly connected to the carrier unit V. These angle iron sections are further welded or otherwise attached to a second set of angle iron sections 130, 132, 134 and 136 which include shoes 130a, 132a, 134a and 136a having flat bottom surfaces adapted to come into contact with the upper sides of respective upper press units, as will be apparent from an inspection of Fig. 2. The connection of the sides 164 and 166 of the carrier unit V to the longitudinal member 134' is more clearly indicated in Fig. 5 and, as noted in that figure, the sides may be separated by bridging pieces 135 to add rigidity to the structure.

It will be observed that these longitudinally extending sections 130', 132', 134' and 136' are arranged to lie immediately below the bottom surface of the beams 100, as suggested in Fig. 2. When the cams 112, 114 are rotated by the shaft 109 and the power driving means described, they work against the cam followers 112', 114', lifting these followers and the attached carrier frames together with the angle sections 130', 132', 134' and 136' which then move up into contact with the transverse beams 100 and lift the entire press assembly through a short vertical path of travel.

In accordance with the invention, the operation of the shaft 109 is timed with respect to the operation of the shafts for the driving wheels or rolls described above, so that a maximum vertical pressure may be exerted through the several shoes 130a, 132a, 134a and 136a at desired points in the interval of travel of abutting sections of sheet material passing through the machine and, in particular, at the point where a maximum force in compression is acting horizontally through the abutting sheet material sections so that these sections can be maintained in an undistorted horizontal plane while abutting edges receive the necessary pressure and heat delivered from the presses to achieve an extremely strong bonding together of these edges. It will also be observed that this method and apparatus for exerting forces of compression in the sheet material sections operates to produce periodic maximum compression conditions adapted to cooperate with the heating which is furnished by the presses while in contact with the work pieces. Because of these flexible features, it is pointed out that a wide range of widths of sections may be continuously placed on the conveyor end of the machine and continuously fed through the driving rolls to be released upon the conveyor at the right-hand side of the machine, as shown in Fig. 1.

From here, the stock may pass to a sizing mechanism such as, for example, is comprised by edge saws 180 and 182 which are driven from a motor 184 through a conventional sprocket and chain drive, as suggested in Fig. 1. A finished piece of stock 186 is shown leaving the sizing mechanism at the right-hand side of Fig. 1 after having been joined along a line of abutment 188.

From the foregoing description of my invention, it will be evident that I have provided an efficient and rapid method for edge joining sections of sheet material and particularly sections of plywood veneer which are required to be held very firmly and to be subjected to the action of both heat and pressure in two dimensions. It will also be seen that I have provided a unique mechanism for carrying out the method of the invention and exerting simultaneously both vertically and horizontally directed forces of compression which build up to a maximum in timed relationship and yet permit stock which has been compressed and joined to pass along in a substantially uninterrupted path of travel.

The apparatus described is intended to constitute one suitable means for carrying out the method of the invention. However, it is intended that this apparatus may be modified in various respects to accomplish the purposes and functions described in accordance with the scope of the claims appended thereto.

I claim:
1. A machine for edge joining plywood veneer sheets comprising a frame, conveyor means mounted in the frame at the front end thereof for horizontally supporting a plurality of plywood veneer sheets with their edges in abutting relationship, upper and lower driving rolls rotatably mounted between the sides of the frame for engaging the veneer sheets at transversely spaced-apart points and advancing them along a horizontal path of movement, said upper and lower rolls having their diameters progressively reduced to provide continuously exerted forces of compression acting in the direction of the path of travel of the veneer sheets, and vertically adjustable platens movable in timed relation into and out of engagement with the sheets during the period in which they undergo horizontal forces of compression by said upper and lower rolls.

2. A structure according to claim 1 in which the platens for exerting vertically directed pressure consists of a series of hollow upper and lower platens.

3. A structure according to claim 1 in which the platens are located between the upper and lower driving rolls.

4. A structure according to claim 3 in which the platens are heated.

5. A machine for edge joining plywood veneer sheets comprising a frame, upper and lower spaced apart driven rolls rotatably mounted in the sides of the frame for engaging the veneer sheets in transverse spaced apart points and advancing said sheets along a horizontal path of movement between said rolls, the upper and lower rolls each having their diameters progressively reduced to thereby provide continuous exerted forces of compression acting in the direction of the path of travel of the veneer sheets and upper and lower platens mounted in a horizontal plane occupying the spaces between the driven rolls.

6. The structure according to claim 5 in which the platens are hollow and are heated.

7. The structure according to claim 5 in which the upper platens are periodically lowered and raised in timed relation to the upper surface of the plywood sheets.

References Cited in the file of this patent
UNITED STATES PATENTS

| | | |
|---|---|---|
| 2,344,488 | Bowling | Mar. 21, 1944 |
| 2,366,588 | Bolling | Jan. 2, 1945 |
| 2,371,331 | Irwin et al. | Mar. 13, 1945 |
| 2,373,376 | Bolling | Apr. 10, 1945 |
| 2,544,133 | Carlson | Mar. 6, 1951 |
| 2,644,496 | Schubert | July 7, 1953 |
| 2,739,628 | Kok | Mar. 27, 1956 |